US010393303B2

(12) United States Patent
Hendrickson

(10) Patent No.: US 10,393,303 B2
(45) Date of Patent: Aug. 27, 2019

(54) THREADED FITTING FOR TUBE

(71) Applicant: United Technologies Corporation, Farmington, CT (US)

(72) Inventor: Timothy R Hendrickson, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 248 days.

(21) Appl. No.: 15/425,372

(22) Filed: Feb. 6, 2017

(65) Prior Publication Data
US 2018/0224043 A1 Aug. 9, 2018

(51) Int. Cl.
F16L 39/00 (2006.01)
F01D 9/06 (2006.01)
F01D 25/16 (2006.01)
F01D 25/18 (2006.01)
F01M 11/02 (2006.01)
F16L 15/00 (2006.01)
F16L 33/00 (2006.01)
F16N 21/00 (2006.01)

(52) U.S. Cl.
CPC ............ F16L 39/005 (2013.01); F01D 9/065 (2013.01); F01D 25/162 (2013.01); F01D 25/18 (2013.01); F01M 11/02 (2013.01); F16L 15/001 (2013.01); F16L 33/00 (2013.01); F16N 21/00 (2013.01); F05D 2220/32 (2013.01); F05D 2230/60 (2013.01); F05D 2260/98 (2013.01)

(58) Field of Classification Search
CPC ....... F16L 39/005; F16L 15/001; F16L 33/00; F01D 9/065; F01D 25/162; F01D 25/18; F01M 11/02; F01M 2011/021; F16N 21/00
See application file for complete search history.

(56) References Cited

U.S. PATENT DOCUMENTS

| 3,248,880 A | 5/1966 | Hull, Jr. |
| 3,272,537 A | 9/1966 | Bellatorre |
| 3,312,448 A | 4/1967 | Hull, Jr. |
| 3,675,950 A * | 7/1972 | Beene ............... F16L 15/006 285/355 |
| 4,156,342 A | 5/1979 | Danko et al. |

(Continued)

FOREIGN PATENT DOCUMENTS

| CN | 101011860 | 8/2007 |
| EP | 2258929 | 12/2010 |

(Continued)

OTHER PUBLICATIONS

European Patent Office, European Search Report dated Mar. 23, 2018 in Application No. 17199700.0-1006.

(Continued)

Primary Examiner — Syed O Hasan
(74) Attorney, Agent, or Firm — Snell & Wilmer, L.L.P.

(57) ABSTRACT

A tubing assembly for fluid delivery to a bearing system may comprise a fitting having an inner surface defining an inner flow path and having an outer surface defining a first mating surface. A first tube may be coupled to the fitting. The fitting may be disposed within a bearing housing of the bearing system. The bearing housing may include a second mating surface in sealing contact with the first mating surface of the fitting.

14 Claims, 6 Drawing Sheets

(56) References Cited

U.S. PATENT DOCUMENTS

| | | | |
|---|---|---|---|
| 4,947,639 A | 8/1990 | Hibner | |
| 4,967,460 A | 11/1990 | Runyan | |
| 4,972,671 A | 11/1990 | Asselin | |
| 4,983,051 A | 1/1991 | Hibner | |
| 5,110,257 A | 5/1992 | Hibner | |
| 5,203,384 A | 4/1993 | Hansen | |
| 5,628,532 A | 5/1997 | Ashcraft | |
| 5,839,268 A | 11/1998 | Morris | |
| 5,951,060 A * | 9/1999 | Fukano | F16L 19/028 285/332 |
| 6,086,114 A | 7/2000 | Ziu | |
| 6,412,820 B1 * | 7/2002 | Erps | F16L 19/005 285/123.1 |
| 6,438,938 B1 | 8/2002 | Burkholder | |
| 7,500,788 B2 | 3/2009 | Joyner | |
| 8,230,974 B2 | 7/2012 | Parnin | |
| 9,494,048 B1 | 11/2016 | Parnin | |
| 2003/0230274 A1 | 12/2003 | Williams | |
| 2010/0207379 A1 | 8/2010 | Olver | |
| 2010/0275572 A1 | 11/2010 | Durocher | |
| 2010/0276026 A1 | 11/2010 | Powell | |
| 2011/0085895 A1 | 4/2011 | Durocher | |
| 2011/0284103 A1 | 11/2011 | Davis | |
| 2012/0011824 A1 * | 1/2012 | Cigal | F01D 9/065 60/39.08 |
| 2013/0022446 A1 | 1/2013 | Chevillot | |
| 2013/0189071 A1 | 7/2013 | Durocher | |
| 2013/0224460 A1 | 8/2013 | Fabrice et al. | |
| 2013/0280043 A1 | 10/2013 | Parnin | |
| 2013/0318940 A1 | 12/2013 | Parnin | |
| 2014/0116561 A1 | 5/2014 | Krall | |
| 2015/0130183 A1 | 5/2015 | Statler, III | |
| 2015/0219011 A1 | 8/2015 | Muldoon | |
| 2015/0354382 A1 | 12/2015 | Pakkala | |
| 2016/0215652 A1 | 7/2016 | Mastro | |
| 2016/0305284 A1 | 10/2016 | Mastro | |
| 2016/0312699 A1 | 10/2016 | Teicholz | |
| 2017/0114662 A1 | 4/2017 | Mastro | |
| 2017/0234158 A1 | 8/2017 | Savela | |
| 2017/0350540 A1 * | 12/2017 | Callaghan | F01D 25/00 |
| 2018/0073395 A1 | 3/2018 | Parnin | |
| 2018/0128122 A1 | 5/2018 | Avis | |
| 2018/0128124 A1 | 5/2018 | Avis | |
| 2018/0230854 A1 | 8/2018 | Parnin | |
| 2018/0283211 A1 | 10/2018 | Parnin | |
| 2018/0306062 A1 | 10/2018 | Avis | |

FOREIGN PATENT DOCUMENTS

| | | |
|---|---|---|
| EP | 2662537 | 11/2013 |
| EP | 2944774 | 11/2015 |
| EP | 3081760 | 10/2016 |
| EP | 3318729 | 5/2018 |
| FR | 2341094 | 9/1977 |
| FR | 3014478 | 6/2015 |
| GB | 623615 | 5/1949 |
| GB | 2218751 | 11/1989 |
| WO | 2014051658 | 4/2014 |
| WO | 2014152123 | 9/2014 |
| WO | 2015102779 | 7/2015 |

OTHER PUBLICATIONS

European Patent Office, European Search Report dated Mar. 23, 2018 in Application No. 17199693.7-1006.
USPTO, Restriction / Election Requirement dated Jan. 2, 2019 in U.S. Appl. No. 15/344,195.
USPTO, Pre-Interview First Office Action dated Dec. 27, 2018 in U.S. Appl. No. 15/425,303.
USPTO, Restriction / Election Requirement dated Jan. 3, 2019 in U.S. Appl. No. 15/425,337.
USPTO, Non-Final Office Action dated Jan. 3, 2019 in U.S. Appl. No. 15/344,157.
U.S. Appl. No. 15/344,132, filed Nov. 4, 2016 and entitled Apparatus and Method for Providing Fluid to a Bearing Damper.
U.S. Appl. No. 15/344,157, filed Nov. 4, 2016 and entitled Apparatus and Method for Providing Fluid to a Bearing Damper.
U.S. Appl. No. 15/344,185, filed Nov. 4, 2016 and entitled Apparatus and Method for Providing Fluid to a Bearing Damper.
U.S. Appl. No. 15/344,195, filed Nov. 4, 2016 and entitled Apparatus and Method for Providing Fluid to a Bearing Damper.
U.S. Appl. No. 15/425,303, filed Feb. 6, 2017 and entitled Tube Fitting.
U.S. Appl. No. 15/425,337, filed Feb. 6, 2017 and entitled Multiwall Tube and Fitting for Bearing Oil Supply.
U.S. Appl. No. 15/425,410, filed Feb. 6, 2017 and entitled Fitting for Multiwall Tube.
European Patent Office, European Search Report dated Jun. 12, 2018 in Application No. 18155139.1-1006.
European Patent Office, European Search Report dated Jun. 22, 2018 in Application No. 18155177.1-1010.
European Patent Office, European Search Report dated Jun. 27, 2018 in Application No. 18155144.1-1007.
European Patent Office, European Search Report dated Jul. 4, 2018 in Application No. 18154684.7-1006.
USPTO, Non-Final Office Action dated Jan. 24, 2019 in U.S. Appl. No. 15/344,132.
USPTO, First Action Interview Office Action dated Jan. 31, 2019 in U.S. Appl. No. 15/425,303.
USPTO, Non-Final Office Action dated Mar. 8, 2019 in U.S. Appl. No. 15/344,195.
USPTO, Non-Final Office Action dated Apr. 29, 2019 in U.S. Appl. No. 15/425,337.
USPTO, Final Office Action dated May 3, 2019 in U.S. Appl. No. 15/425,303.
USPTO, Non-Final Office Action dated May 16, 2019 in U.S. Appl. No. 15/344,185.
USPTO, Final Office Action dated May 30, 2019 in U.S. Appl. No. 15/344,157.
USPTO, Notice of Allowance dated Jun. 7, 2019 in U.S. Appl. No. 15/425,337.
USPTO, Advisory Action dated Jun. 10, 2019 in U.S. Appl. No. 15/425,303.
USPTO, Final Office Action dated Jun. 10, 2019 in U.S. Appl. No. 15/344,132.

\* cited by examiner

THREADED FITTING FOR TUBE

FIELD

The present disclosure relates to gas turbine engines and, more particularly, to lubricant transport for bearing systems of gas turbine engine.

BACKGROUND

Gas turbine engines typically include a fan section, a compressor section, a combustor section and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Gas turbine engines generally include one or more bearing systems that support rotation of various components relative to an engine static structure or engine case. Gas turbine engines may use oil for cooling and lubrication of the bearing systems. Lubrication systems, such as those used in aircraft gas turbine engines, supply lubricant to bearings, gears and other engine components that use lubrication. The lubricant, typically oil, cools the components and protects them from wear. A typical oil lubrication system includes conventional components such as an oil tank, pump, filter and oil supply conduits. Tubing and conduits of various types can be used to route fluids throughout an engine, for example. Various double wall tubes may be used for delivery and transport of fluids, such as oil. A double wall tube may have an outer passage formed between an inner tube and an outer tube. The inner tube and the outer tube may each carry a fluid, and it may be difficult to maintain separation of the fluids at the exit of a double wall tube. Further, engine oil tubes and fittings may be subjected to relatively high temperatures. Once subjected to excessive heating, oil may undergo coking. Oil coking may cause solid oil deposits to form within oil tubes, causing undesirable effects such as blocked passageways and filters.

SUMMARY

A tubing assembly is described herein, in accordance with various embodiments. The tubing assembly for fluid delivery to a bearing system may comprise a fitting having an inner surface defining an inner flow path and having an outer surface defining a first mating surface. A first tube may be coupled to the fitting. The fitting may be disposed within a bearing housing of the bearing system. The bearing housing may include a second mating surface in sealing contact with the first mating surface of the fitting.

In various embodiments, the first mating surface of the fitting contacts the second mating surface of the bearing housing to form an interference fit in response to rotating the fitting within the bearing housing. The outer surface of the fitting may further comprise threading configured to couple to threading of the bearing housing. The first mating surface of the fitting may comprise a frustoconical shape. An angle of the first mating surface of the fitting relative to a longitudinal axis of the fitting may range from 15 to 50 degrees. The first tube may be disposed within a second tube. An outer fluid path may be defined between the first tube and the second tube. The fitting may be configured to fluidly isolate the inner flow path from the outer fluid path. A pressure of a first fluid in the inner flow path may be different than a pressure of a second fluid in the outer fluid path.

A mid-turbine frame for a gas turbine engine is also provided. The mid-turbine frame may comprise a bearing system including a bearing housing. A first tube may define an inner fluid passage configured to carry a first fluid to the bearing system. A fitting may be coupled to the first tube and to the bearing housing. The fitting may have an inner surface defining an inner flow path and may have an outer surface defining a first mating surface. The bearing housing may include a second mating surface in sealing contact with the first mating surface of the fitting.

In various embodiments, the first mating surface of the fitting contacts the second mating surface of the bearing housing to form an interference fit in response to rotating the fitting within the bearing housing. The outer surface of the fitting may further comprise threading configured to couple to threading of the bearing housing. The first mating surface of the fitting may comprise a frustoconical shape. An angle of the first mating surface of the fitting relative to a longitudinal axis of the fitting may range from 15 to 50 degrees. The first tube may be disposed within a second tube. An outer fluid path may be defined between the first tube and the second tube. The fitting may be configured to fluidly isolate the inner flow path from the outer fluid path. The bearing system may further comprise a bearing damper. The bearing housing may define a bearing damper path. The inner fluid passage may be in fluid communication with the bearing damper path.

A method of method of assembling a tubing assembly is also provided. The method may comprise the step of coupling a first tube to a fitting. The fitting may have an inner surface defining an inner flow path and having an outer surface defining a first mating surface. The method may comprise the step of inserting the fitting into a bearing housing. The bearing housing may have a second mating surface with a complementary shape to the first mating surface of the fitting. The method may comprise the step of rotating the fitting about a longitudinal axis of the fitting to contact the first mating surface of the fitting with the second mating surface of the bearing housing.

In various embodiments, the first mating surface of the fitting may contact the second mating surface of the bearing housing to form an interference fit in response to rotating the fitting within the bearing housing. The method may further comprise the step of disposing the first tube and the fitting through a second tube prior to rotating the fitting. The step of rotating the fitting may threadingly couple the fitting to the bearing housing. The method may further comprise the step of delivering a first fluid through the inner flow path to the bearing housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

The present disclosure relates to fittings for tubing assemblies. A multiwall tube may define two or more concentric fluid paths. For example, an inner tube may define a first fluid path. A second fluid path may be defined between the inner tube and an outer tube. It may be desirable to fluidly isolate the first fluid path from the second fluid path. A fitting may join an end of an inner tube with an end of an outer tube, while maintaining separation of the fluid paths.

Figure 1:
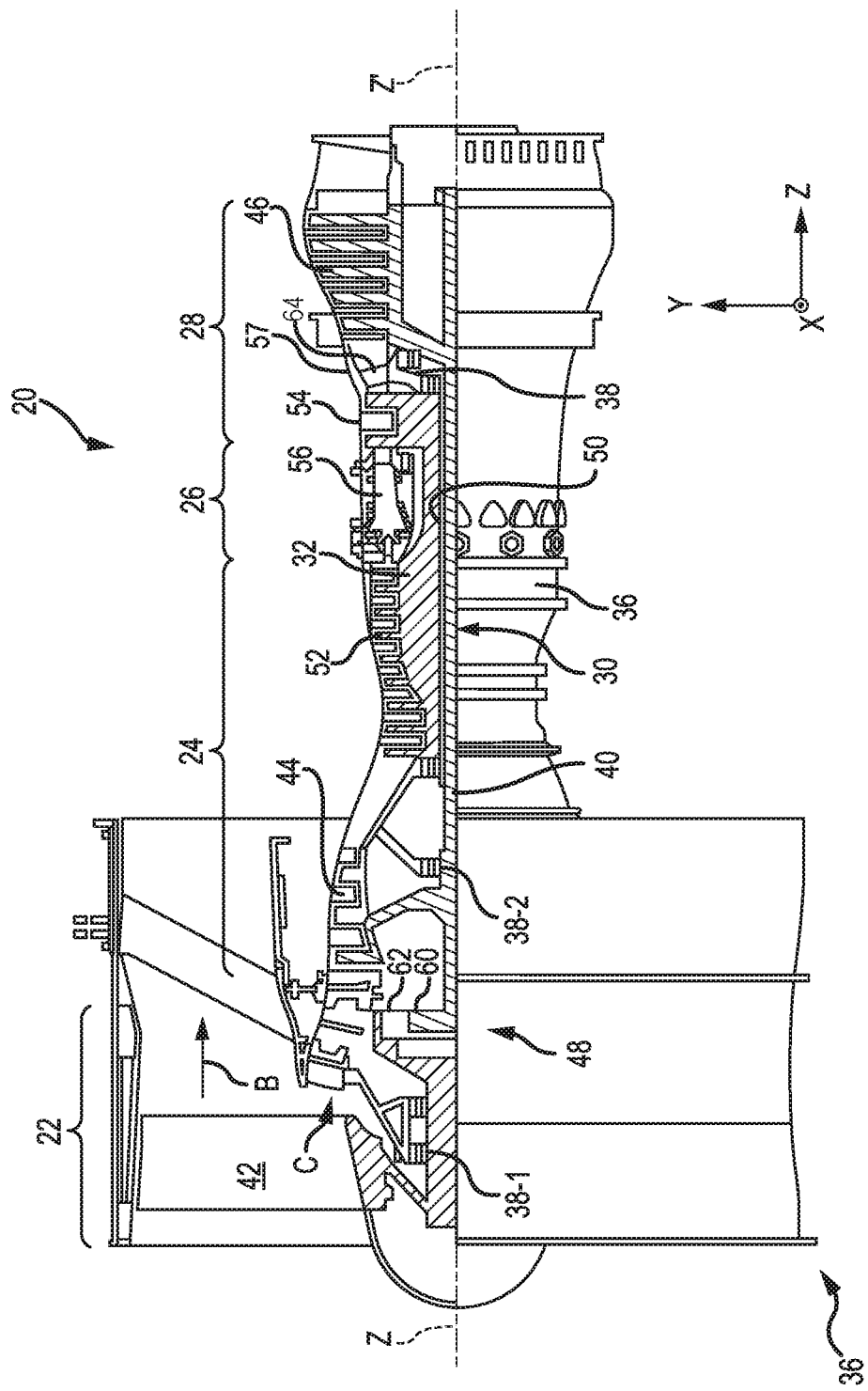
FIG. 1 illustrates a cross-sectional view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow path B while compressor section 24 can drive coolant along a core flow path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis Z-Z' relative to an engine static structure 36 or engine case via several bearing systems 38, 38-1, and 38-2. Engine central longitudinal axis Z-Z' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis Z-Z', which is collinear with their longitudinal axes. As used herein, a "high pressure" compressor or turbine experiences a higher pressure than a corresponding "low pressure" compressor or turbine.

The airflow of core flow path C may be compressed by low pressure compressor 44 then high pressure compressor 52, mixed and burned with fuel in combustor 56, then expanded over high pressure turbine 54 and low pressure turbine 46. Mid-turbine frame 57 may include airfoils 64, which are in core flow path C. Turbines 46, 54 rotationally drive the respective low speed spool 30 and high speed spool 32 in response to the expansion.

Gas turbine engine 20 may be, for example, a high-bypass ratio geared engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

Figure 2:
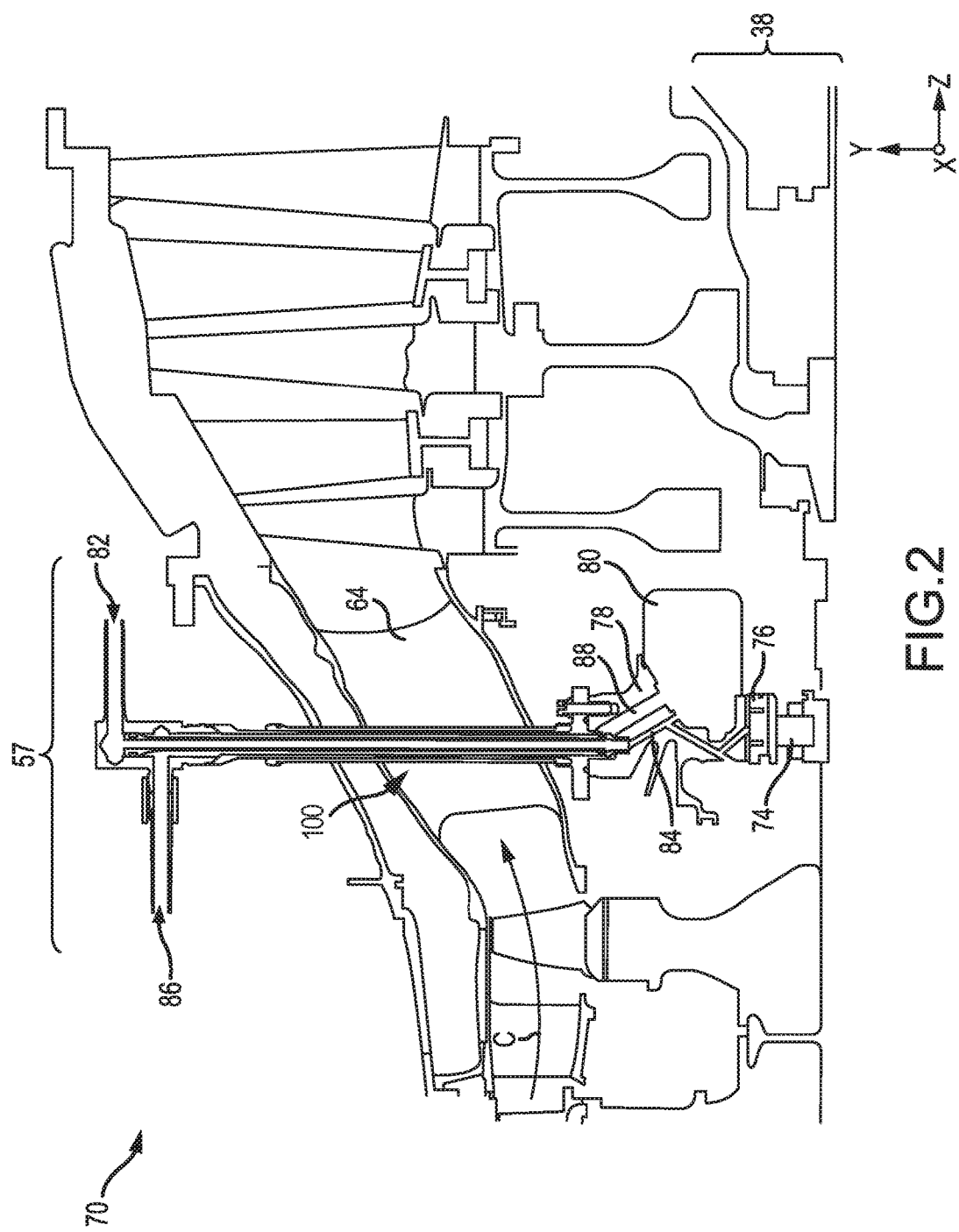
FIG. 2 illustrates a cross-sectional view of a turbine section with a mid-turbine frame and an oil supply tube, in accordance with various embodiments.

With reference now to FIG. 2 and still to FIG. 1, a portion of an engine section 70 is shown, in accordance with various embodiments. Although engine section 70 is illustrated in FIG. 2, for example, as a turbine section, it will be understood that the tubing assemblies in the present disclosure are not limited to the turbine section, and could extend to other sections of the gas turbine engine 20 and to other bearing assemblies. In various embodiments, engine section 70 may include mid-turbine frame 57 of gas turbine engine 20. Mid-turbine frame 57 may be located aft of high pressure turbine 54 and forward of low pressure turbine 46 and may be mechanically coupled to bearing system 38.

In various embodiments, mid-turbine frame 57 may include a bearing 74, a bearing damper 76, and a bearing housing 78, which may define a bearing compartment 80. Mid-turbine frame 57 may include a tubing assembly 100 for fluid delivery to bearing system 38. Tubing assembly 100 may be coupled to bearing housing 78 and may be configured to transport fluid to and/or from bearing compartment 80 and bearing damper 76. For example, tubing assembly 100 may deliver a first fluid from a first fluid source 82 to bearing damper 76 through a bearing damper path 84 defined by bearing housing 78. The first fluid may be used to lubricate bearing damper 76. Tubing assembly 100 may deliver a second fluid from a second fluid source 86 to bearing compartment 80 through a bearing compartment path 88 defined by bearing housing 78. The second fluid may be used to lubricate at least a portion of bearing compartment 80.

Tubing assembly 100 may extend through airfoil 64. Hot exhaust gas in core flow path C may impinge on airfoil 64 which may cause airfoil 64 to increase in temperature due to convective heat transfer from the hot exhaust. In various embodiments, heat may radiate to other nearby components which may cause the nearby components to increase in temperature. In return, the nearby components may transfer heat to other adjacent components and/or fluids. For example, heat may radiate from airfoil 64 to tubing assembly 100 and may convectively transfer heat from airfoil 64 to tubing assembly 100. Tubing assembly 100 may be configured to limit heat transfer to the fluids within tubing assembly 100.

Figure 3:
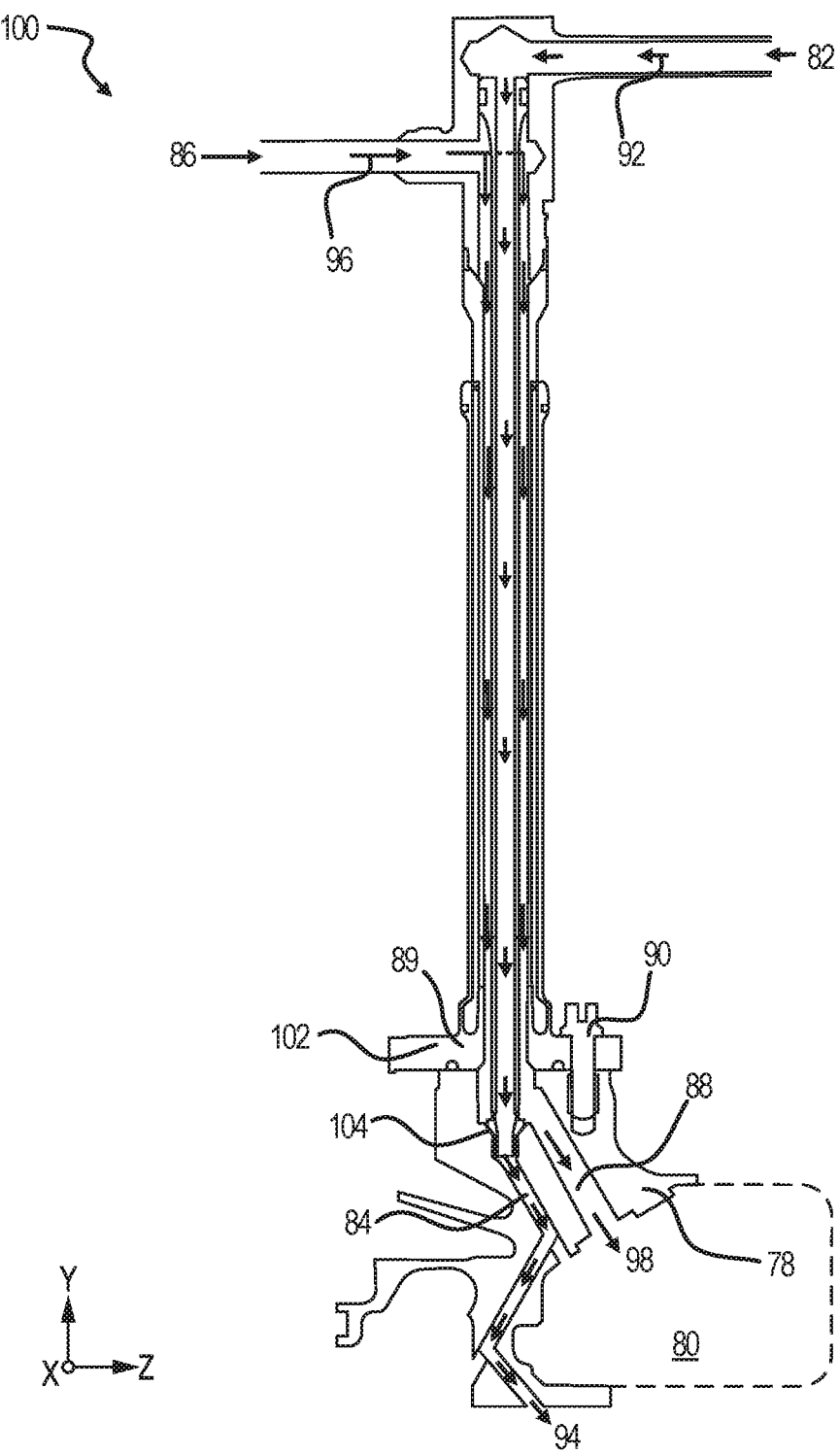
FIG. 3 illustrates a cross-sectional view of a tubing assembly and bearing compartment, in accordance with various embodiments.

Referring to FIG. 3, a tubing assembly 100 and bearing housing 78 is shown, in accordance with various embodiments. Tubing assembly 100 may be coupled to bearing housing 78 by one or more fittings 102, 104 and/or fasteners 90 configured to secure tubing assembly 100 to bearing housing 78. Tubing assembly 100 may be configured to deliver a first fluid 92 from first fluid source 82 to bearing damper path 84. First fluid 92 flows through tubing assembly 100 and bearing damper path 84 and to bearing damper 76 (FIG. 2) through a first outlet 94 in bearing housing 78.

Tubing assembly 100 may further be configured to deliver a second fluid 96 from second fluid source 86 to bearing compartment path 88. Second fluid 96 flows through tubing assembly 100 and bearing compartment path 88 and to bearing compartment 80 through a second outlet 98 in bearing housing 78. Tubing assembly 100 may be configured to maintain first fluid 92 separated from second fluid 96. First fluid 92 and second fluid 96 may contain similar or different fluids, which may have similar or different temperatures and/or pressures.

Figure 4:
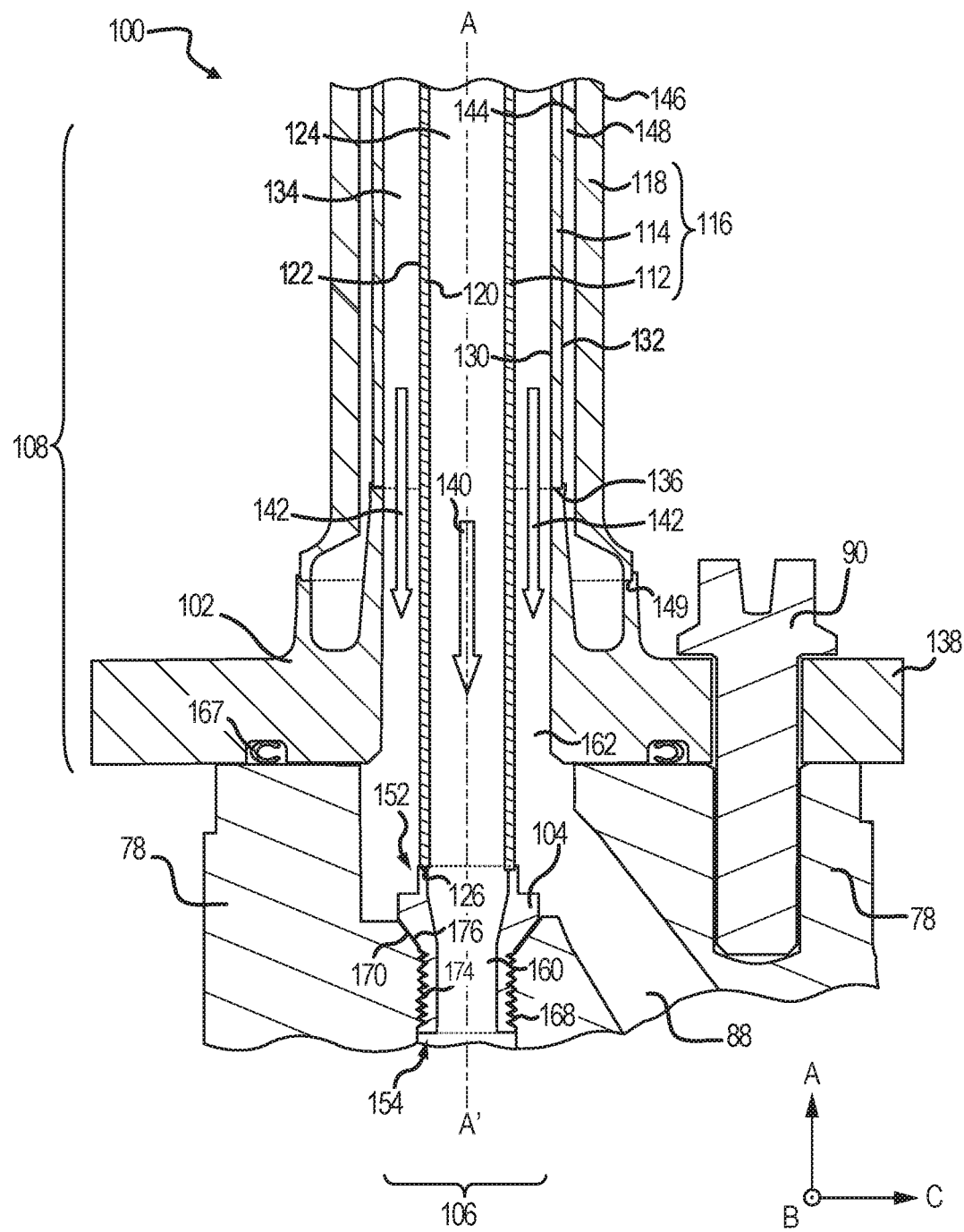
FIG. 4 illustrates a cross-sectional view of a tubing assembly, in accordance with various embodiments.

Referring to FIG. 4, a portion of a tubing assembly 100 is shown, in accordance with various embodiments. Tubing assembly 100 may include one or more tubes, such as a first tube 112. First tube 112 may be configured to couple to bearing housing 78 via fitting 104. First tube 112 and fitting 104 may comprise an inner assembly 106 of tubing assembly 100. Tubing assembly 100 may include a second tube 114. Second tube 114 may be configured to couple to bearing housing 78 via fitting 102. Second tube 114 and fitting 102 may comprise an outer assembly 108 of tubing assembly 100.

First tube 112 may be disposed within second tube 114. Second tube 114 may be positioned around first tube 112 in a concentric and/or coaxial arrangement. First tube 112 and second tube 114 together may form at least a portion of a multiwall tube 116. Multiwall tube 116 may further include third tube 118. First tube 112 and second tube 114 may be disposed within third tube 118. In various embodiments, third tube 118 may comprise an outer sleeve that encases at least a portion of second tube 114. Third tube 118 may be configured to prevent heat transfer from surrounding hot air to second tube 114 and/or first tube 112. In various embodiments, first tube 112, second tube 114 and third tube 118 may be concentric about a longitudinal axis A-A', which is collinear with the longitudinal axes of first tube 112, second tube 114 and third tube 118 and which is parallel to the A-direction on the provided ABC axes.

First tube 112 may include an inner surface 120 and an outer surface 122. First tube 112 may include an inner fluid passage 124 defined by inner surface 120. Second tube 114 may include an inner surface 130 and an outer surface 132. An outer fluid passage 134 may be defined between first tube 112 and second tube 114. Outer fluid passage 134 may have a generally annular cross section. Each of inner fluid passage 124 and outer fluid passage 134 may contain a fluid, such as lubricant, oil, fuel, air or other fluid. Inner fluid passage 124 and outer fluid passage 134 may contain similar or different fluids, which may have similar or different temperatures and/or pressures.

An inner surface 120 of first tube 112 may define a first fluid path 140 through inner fluid passage 124. Outer surface 122 of first tube 112 and an inner surface 130 of second tube 114 may define a second fluid path 142 through outer fluid passage 134. First fluid path 140 and second fluid path 142 are each illustrated as flowing in the negative A-direction on the provided ABC axes. It is further contemplated and understood that first fluid path 140 and/or second fluid path 142 may flow in various directions, including the positive A-direction, in accordance with various embodiments. As used herein, "distal" refers to the direction toward the negative A-direction on the provided ABC axes relative to tubing assembly 100. As used herein, "proximal" refers to a direction toward the positive A-direction on the provided ABC axes relative to tubing assembly 100.

Third tube 118 may include an inner surface 144 and an outer surface 146. An inner surface 144 of third tube 118 and outer surface 132 of second tube 114 may define a gap or a chamber 148. Chamber 148 may be occupied by air, thereby providing a thermal shield for first tube 112 and second tube 114 to reduce heat transfer from surrounding hot air to first fluid path 140 and second fluid path 142. Chamber 148 may further be configured to contain oil or other fluid within third tube 118 in the event that there is a fluid leak from first tube 112 and/or second tube 114.

In various embodiments, tubing assembly 100 may comprise fitting 102 configured to couple to second tube 114 and third tube 118 to bearing housing 78. More specifically, fitting 102 may be configured to couple to a distal end 136 of second tube 114 and to a distal end 149 of third tube 118. Distal end 136 of second tube 114 and distal end 149 of third tube 118 may be mechanically fastened, welded, brazed, adhered and/or otherwise attached to fitting 102. Fitting 102 may be coupled to or integral with second tube 114 and/or third tube 118. As used herein, the term "integrated" or "integral" may include being formed as one, single continuous piece. Fitting 102 may further include a flange 138 extending radially outward from longitudinal axis A-A'. One of more fasteners 90 may extend through flange 138 to secure fitting 102 to bearing housing 78. In various embodiments, a seal 167 may be disposed between fitting 102 and bearing housing 78. Seal 167 may be configured to provide a fluid-tight seal between fitting 102 and bearing housing 78. Seal 167 may include, for example, a C-seal, brush seal, carbon seal, O-ring seal or other seal type. In this regard, a C-seal may have a cross-sectional shape that is partially circular.

Tubing assembly 100 may comprise a fitting 104 configured to couple first tube 112 to bearing housing 78. More specifically, fitting 104 may be configured to couple to a distal end 126 of first tube 112. Fitting 104 may comprise a proximal end 152 and a distal end 154 opposite to the proximal end 152. Distal end 126 of first tube 112 may be mechanically fastened, welded, brazed, adhered and/or otherwise attached to proximal end 152 of fitting 104. Fitting 104 may further be configured to couple to bearing housing 78, which may be configured to receive fluid from first fluid path 140. Fitting 104 may define an inner fluid passage 160, which forms a continuous fluid path with inner fluid passage 124 of first tube 112.

Figure 5B:
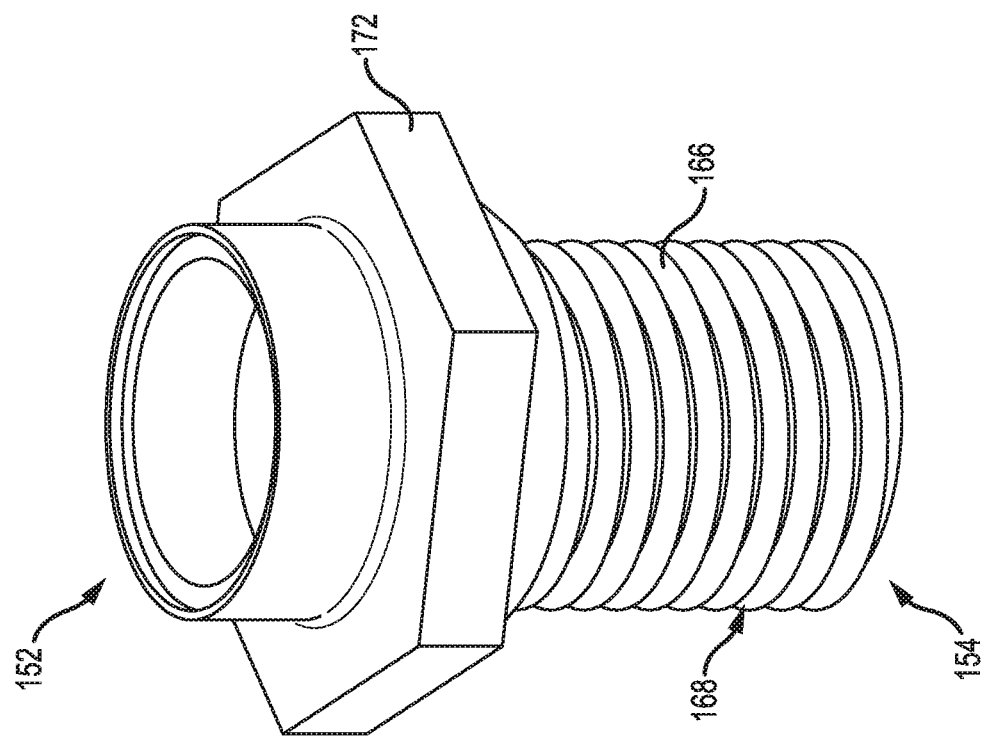
FIGS. 5A and 5B illustrate a cross-sectional view and a perspective view, respectively, of a fitting, in accordance with various embodiments.
Figure 5A:
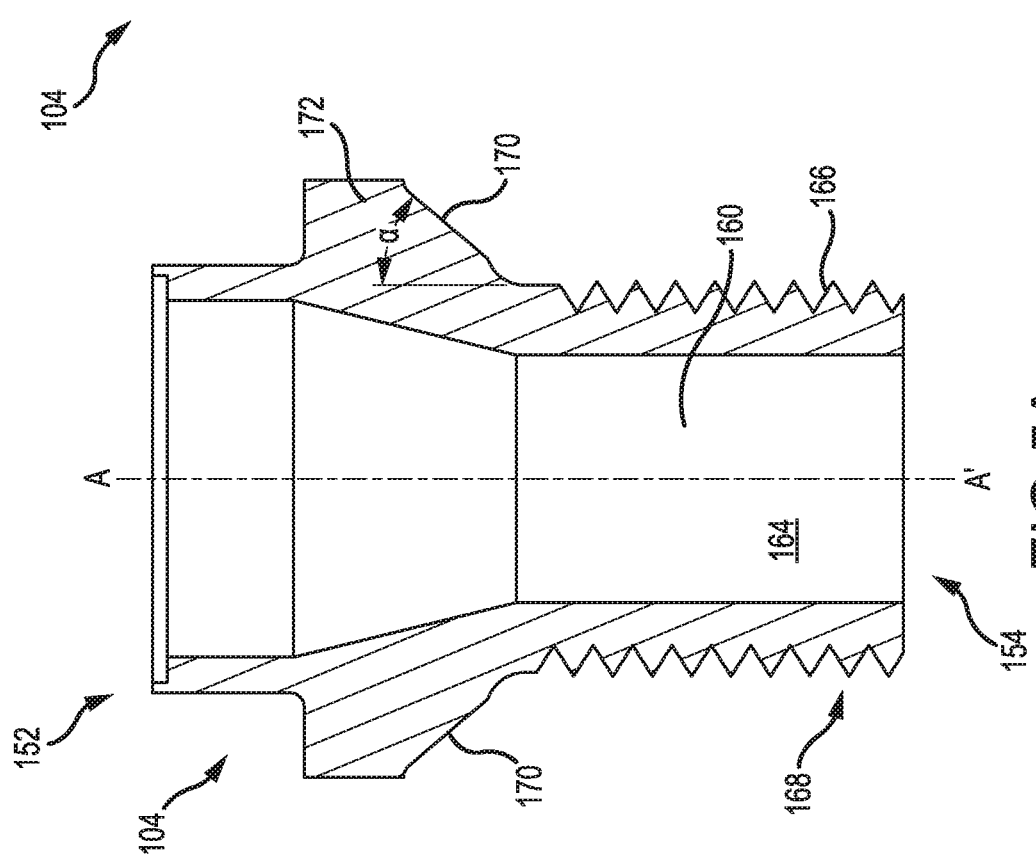

Referring to FIGS. 5A and 5B and still to FIG. 4, a fitting 104 for a tubing assembly 100 is shown, in accordance with various embodiments. Fitting 104 may have a generally cylindrical tube-shaped body with an inner surface 164 defining inner fluid passage 160. An outer surface 166 of fitting 104 may comprise, for example, a male mating surface of fitting 104 having threading 166 disposed about an outer diameter of fitting 104. An outer surface 166 of fitting 104 may comprise a first mating surface 170, which may be configured as a cone seat having a frustoconical shape. First mating surface 170 may be oriented at an angle α ("alpha") relative to longitudinal axis A-A' ranging from 15 to 50 degrees. For example, first mating surface 170 may have an angle of about 37 degrees relative to longitudinal axis A-A', wherein "about" in this context only means+/−1°. Threading 166 and first mating surface 170 may provide an interface to connect fitting 104 to bearing housing 78.

In various embodiments, a wrenching feature 172 may protrude from the body of fitting 104 in a generally radial direction relative to longitudinal axis A-A'. Wrenching feature 172 may be a flange integral with the body of fitting 104. Wrenching feature 172 may comprise a polygonal shape to engage a wrench during installation, maintenance, or removal. The configuration and size of wrenching feature 172 may vary. For example, the wrenching feature may be configured in 6-point hexagonal configuration or 12-point dodecagonal configuration.

Fitting 104 may be inserted into bearing housing 78 and threaded or otherwise attached to bearing housing 78. Bearing housing 78 may define an aperture having a threaded inner diameter with threading 174. Threading 166 of fitting 104 may be configured to engage with threading 174 of bearing housing 78. Bearing housing 78 may further include a second mating surface 176, which may include a complementary shape or angle to first mating surface 170 of fitting 104. Threading 166, 174 may also urge first mating surface 170 of fitting 104 against second mating surface 176 of bearing housing 78 in response to rotation about longitudinal axis A-A' caused by, for example, rotation of wrenching feature 172, such as rotation of wrenching feature 172 in response to rotation by a wrench or other tool. In response to rotation of fitting 104, first mating surface 170 of fitting 104 may be in sealing contact with second mating surface 176 of bearing housing 78. In various embodiments, first mating surface 170 and second mating surface 176 may impinge each other and may form an interference fit. First mating surface 170 and second mating surface 176 may form a fluid-tight seal to maintain first fluid path 140 separate and fluidly isolated from second fluid path 142.

Referring momentarily to FIGS. 2 and 4, fitting 104 may be used to couple to a tube, such as first tube 112, and to a bearing system 38 for delivering fluid to the bearing system 38, in accordance with various embodiments. As discussed above, fitting 104 may couple first tube 112 to bearing housing 78. Fitting 104 may further be configured to maintain a position of first tube 112 with respect to bearing housing 78 and/or second tube 114, for example, to hold first tube 112 in a fixed position relative to bearing housing 78 and/or second tube 114. Thus, fitting 104 may provide structural support for the first tube 112.

Referring again to FIG. 3 and still to FIG. 4, fitting 104 may receive the first fluid 92 from first fluid path 140. Inner fluid passage 160 of fitting 150 may be fluidly coupled to the inner fluid passage 124 of first tube 112 and may be configured to carry the first fluid 92 to bearing damper path 84. An outer fluid passage 162 may be defined between first tube 112 and fitting 102. Outer fluid passage 162 may form a continuous fluid path with outer fluid passage 134. Outer fluid passage 162 may be configured to carry the second fluid 96 of second fluid path 142 to bearing compartment path 88. The first fluid 92 may have similar or different characteristics from the second fluid 96. For example, the first fluid 92 of first fluid path 140 may have a higher pressure than the second fluid 96 of second fluid path 142. The first fluid 92 of first fluid path 140 may also have a higher temperature than the second fluid 96 of second fluid path 142. Fitting 104 may be any suitable material for the thermal environment encountered by the fitting 104, including for example a metallic and/or non-metallic material.

Figure 6:
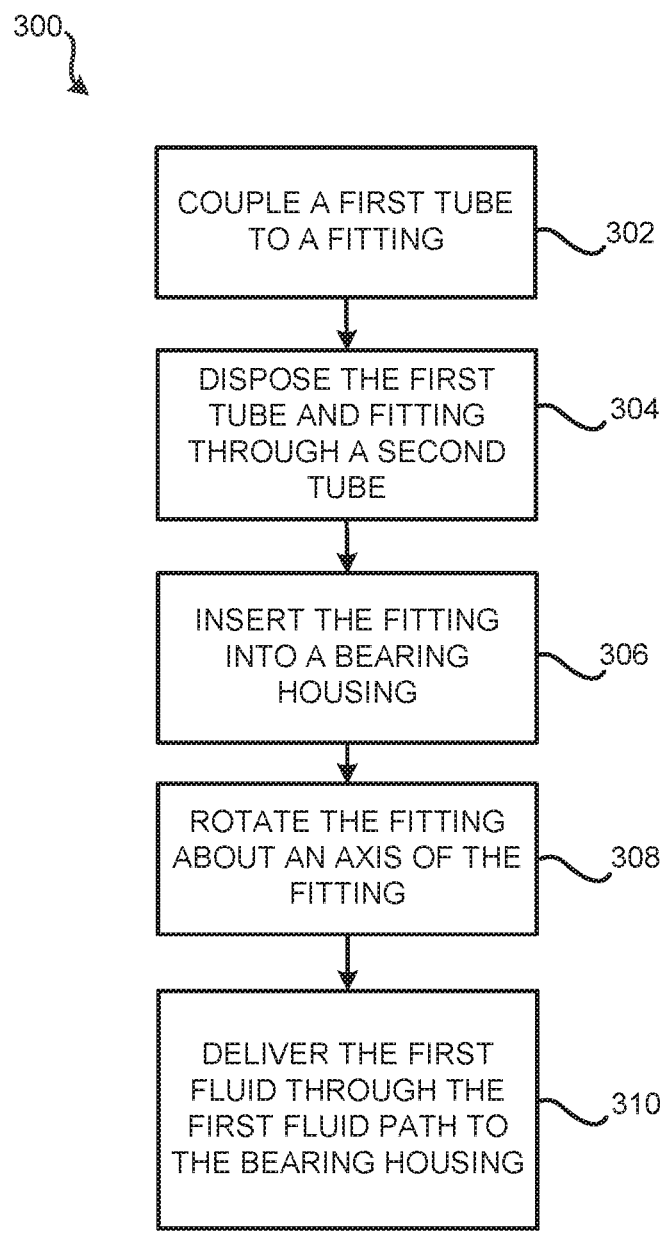
FIG. 6 illustrates method of assembling a tubing assembly, in accordance with various embodiments.

With reference to FIG. 6, a method 300 of delivering lubricant to a bearing system is shown, in accordance with various embodiments. Method 300 may comprise the step of coupling a first tube to a fitting (step 302). The fitting may have an inner surface defining an inner flow path and having an outer surface defining a first mating surface. Method 300 may comprise the step of disposing the first tube and the fitting through a second tube (step 304). Method 300 may comprise the step of inserting the fitting into a bearing housing (step 306). The bearing housing may have a second mating surface with a complementary shape to the first mating surface of the fitting. Method 300 may comprise the steps of rotating the fitting about a longitudinal axis of the fitting (step 308), and comprising delivering a first fluid through the inner flow path to the bearing housing (step 310).

Step 304 may further comprise disposing the first tube and the fitting through a second tube prior to rotating the fitting. The first mating surface of the fitting contacts the second mating surface of the bearing housing to form an interference fit in response to rotating the fitting within the bearing housing. Step 308 may further comprise rotating the fitting about a longitudinal axis of the fitting to contact the first mating surface of the fitting with the second mating surface of the bearing housing. Rotating the fitting threadingly may couple the fitting to the bearing housing.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tubing assembly for a lubricating fluid delivery to a bearing system of a gas-turbine engine, comprising: a fitting having an inner surface defining an inner flow path for lubricating fluid and having an outer surface defining a first mating surface, the fitting further comprising threading configured to couple to threading of a bearing housing of the bearing system; and a first tube coupled to the fitting, the fitting disposed within the bearing housing, wherein the bearing housing includes a second mating surface in sealing contact with the first mating surface of the fitting; a seal between the fitting and the bearing housing configured to provide a fluid-tight seal between the fitting and the bearing housing; wherein the first mating surface and the second mating surface are complimentary to one another; and wherein first threading on the first mating surface and second threading on the second surface urges the first mating surface together with the second mating surface in response to rotating the fitting within the bearing housing, wherein the first tube is disposed within a second tube, an outer fluid path defined between the first tube and the second tube, and wherein the fitting is configured to fluidly isolate the inner flow path from the outer fluid path, and wherein a first pressure of a first fluid in the inner flow path is different than a second pressure of a second fluid in the outer fluid path.

2. The tubing assembly of claim 1, wherein the first mating surface of the fitting contacts the second mating surface of the bearing housing to form an interference fit in response to rotating the fitting within the bearing housing.

3. The tubing assembly of claim 1, wherein the first mating surface of the fitting comprises a frustoconical shape.

4. The tubing assembly of claim 1, wherein an angle of the first mating surface of the fitting relative to a longitudinal axis of the fitting is about 37 degrees.

5. A mid-turbine frame for a gas turbine engine, comprising: a bearing system including a bearing housing; a first tube defining an inner fluid passage configured to carry a first lubricating fluid to the bearing system; and a fitting coupled to the first tube and to the bearing housing, the fitting having an inner surface defining an inner flow path and having an outer surface defining a first mating surface; wherein the bearing housing includes a second mating surface in sealing contact with the first mating surface of the fitting, the outer surface of the fitting further comprising threading configured to couple to threading of the bearing housing; a seal between the fitting and the bearing housing configured to provide a fluid-tight seal between the fitting and the bearing housing; wherein the first mating surface and the second mating surface are complimentary to one another; and wherein first threading on the first mating surface and second threading on the second surface urges the first mating surface together with the second mating surface in response to rotating the fitting within the bearing housing, wherein the first tube is disposed within a second tube, an outer fluid path defined between the first tube and the second tube, and wherein the fitting is configured to fluidly isolate the inner flow path from the outer fluid path, and wherein a first pressure of the first fluid in the inner flow path is different than a second pressure of a second fluid in the outer fluid path.

6. The mid-turbine frame of claim 5, wherein the first mating surface of the fitting contacts the second mating surface of the bearing housing to form an interference fit in response to rotating the fitting within the bearing housing.

7. The mid-turbine frame of claim 5, wherein the first mating surface of the fitting comprises a frustoconical shape.

8. The mid-turbine frame of claim 5, wherein an angle of the first mating surface of the fitting relative to a longitudinal axis of the fitting is about 37 degrees.

9. The mid-turbine frame of claim 5, wherein the bearing system further comprises a bearing damper, and wherein the bearing housing defines a bearing damper path.

10. The mid-turbine frame of claim 9, wherein the inner fluid passage is in fluid communication with the bearing damper path.

11. A method of assembling a lubricating tubing assembly in a gas-turbine engine, comprising: coupling a first tube to a fitting, the fitting having an inner surface defining an inner flow path for lubricating fluid and having an outer surface defining a first mating surface; inserting the fitting into a bearing housing of the gas-turbine engine, the bearing housing having a second mating surface with a complementary shape to the first mating surface of the fitting; disposing the first tube and the fitting through a second tube, an outer fluid path defined between the first tube and the second tube, wherein the fitting is configured to fluidly isolate the inner flow path from the outer fluid path; and rotating the fitting about a longitudinal axis of the fitting to contact the first mating surface of the fitting with the second mating surface of the bearing housing and threadingly coupling the fitting to the bearing housing, and wherein a first pressure of a first fluid in the inner flow path is different than a second pressure of a second fluid in the outer fluid path.

12. The method of claim 11, wherein the first mating surface of the fitting contacts the second mating surface of the bearing housing to form an interference fit in response to rotating the fitting within the bearing housing.

13. The method of claim 11, further comprising delivering the first fluid through the inner flow path to the bearing housing.

14. The mid-turbine frame of claim 5, wherein the second tube is disposed within a third tube, the third tube being concentric with the second tube.

* * * * *